United States Patent [19]

Caverly

[11] Patent Number: 4,485,545
[45] Date of Patent: Dec. 4, 1984

[54] METHOD OF ATTACHING A METAL SHAFT TO A CERAMIC SHAFT AND PRODUCT THEREOF

[75] Inventor: John C. Caverly, Dearborn, Mich.

[73] Assignee: Ford Motor Company, Dearborn, Mich.

[21] Appl. No.: 511,436

[22] Filed: Jul. 7, 1983

[51] Int. Cl.³ .......................... B23P 11/02; F16C 9/00
[52] U.S. Cl. ........................................ 29/447; 29/451; 403/28; 403/29; 403/20; 403/273
[58] Field of Search ............... 403/28, 29, 30, 273; 29/446, 447, 450, 451, 455 R

[56] References Cited

U.S. PATENT DOCUMENTS 3,668,754  6/1972  Boast .................................... 29/447
4,377,335  3/1983  Fannon et al. ........................ 29/447

FOREIGN PATENT DOCUMENTS 2734747  2/1979  Fed. Rep. of Germany ...... 403/273

Primary Examiner—Howard N. Goldberg
Assistant Examiner—Steven E. Nichols
Attorney, Agent, or Firm—William E. Johnson; Olin B. Johnson

[57] ABSTRACT

A method of attaching a metal shaft (10) to a ceramic shaft (12) having a first diameter ($d_1$) is characterized by the following steps. A shaft portion (16) is formed on the ceramic shaft with a second diameter ($d_2$) less than the first diameter. The shaft portion extends from a free end (18) thereof along a portion of the length of the ceramic shaft to a terminal end (20) thereof. A circular shaped metal lock nut (22) is placed on the shaft portion in an encircling relationship therewith. This lock nut has threads (24) on an outer facing surface thereof and a back end (26) which contacts the terminal end of the shaft portion. A circular shaped expansion sleeve (28) is placed on the shaft portion in an encircling relationship therewith, the expansion sleeve extending from the metal lock nut to the free end of the shaft portion. All of the members are cooled and then assembled with an adjustable metal plug (30) and the metal shaft formed so as to have both a hollow interior portion (34) and threads (36) formed on a free end (32) of the metal shaft. The assembly is carried out so that the threads of the lock nut are engaged with the threads of the metal shaft. The expansion sleeve is trapped in a volume defined by the shaft portion, the hollow interior portion of the metal shaft, the lock nut, and the adjustable metal plug. The plug is encircled by the hollow interior portion of the metal shaft and is located between the free end of the shaft portion and a closed end (38) of the hollow interior portion of the metal shaft.

4 Claims, 2 Drawing Figures

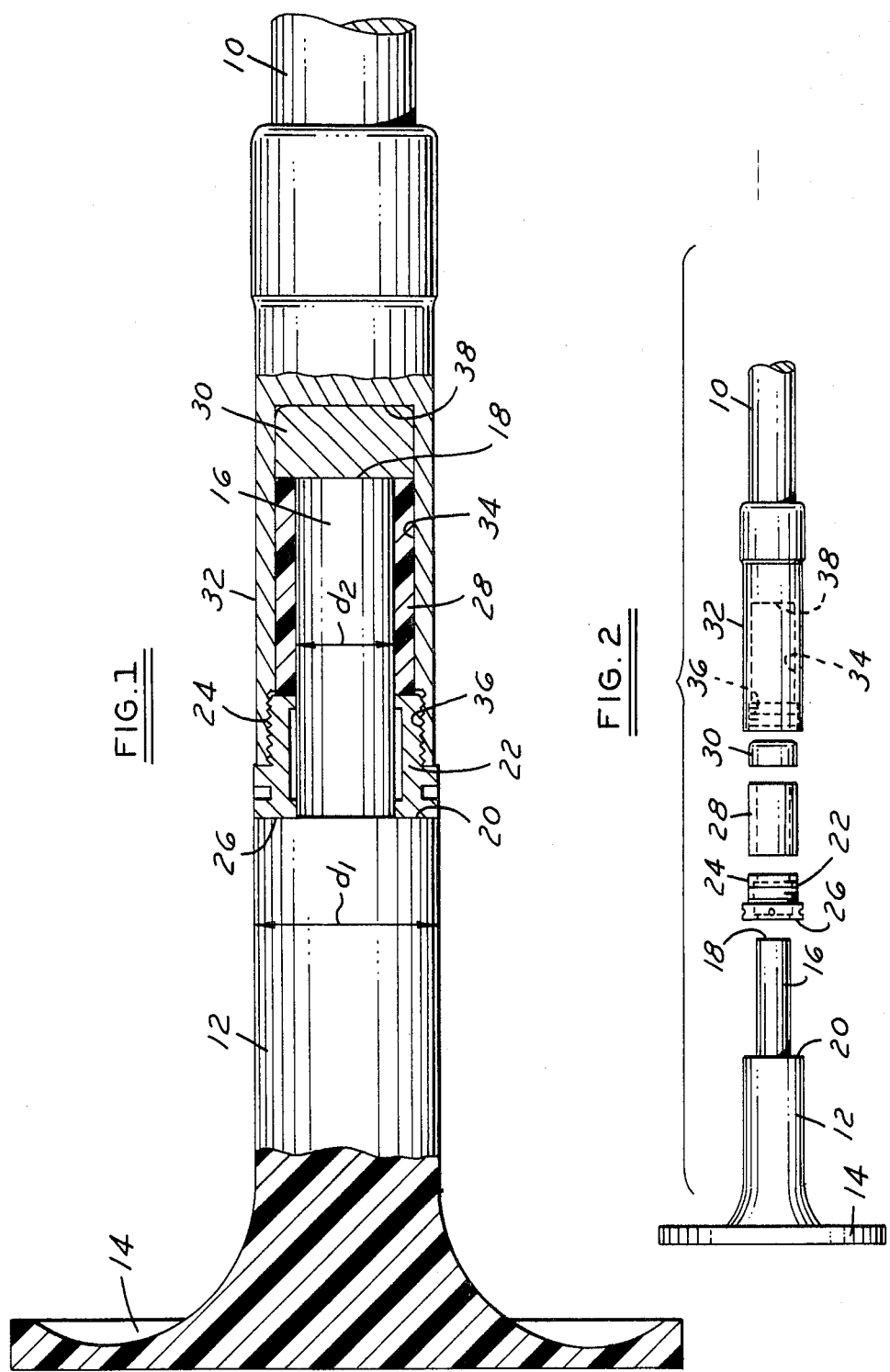

METHOD OF ATTACHING A METAL SHAFT TO A CERAMIC SHAFT AND PRODUCT THEREOF

BACKGROUND ART AND PRIOR ART STATEMENT

No prior art search was conducted on the subject matter of this specification in the U.S. Patent and Trademark Office or any other search facility. I am unaware of any prior art attachment method for attaching a metal shaft to a ceramic shaft or product produced thereby which is relevant to the method and product disclosed in this specification other than the information which is set out hereinbelow.

Parts formed from high temperature resistant ceramics are usually thought of as replacements for high temperature parts in turbine and piston engines. Presently, the parts for such turbines and piston engines are made of very expensive metal alloys which have operating temperature limits in a range of 1800°–2000° F. Such temperature limits presently limit the thermal efficiency of turbine and piston engines. The thermal efficiency of such turbine and piston engines can be improved if ceramic parts are substituted for the metal alloys as the ceramic parts could have operational temperature limits in a range of 2300°–2500° F. or higher. Such an increase in operational temperature, of course, provides for greater thermodynamic efficiency as is well known in the art.

Unfortunately, replacing metal alloy parts with ceramic parts generally requires a ceramic to metal joint at some point. These joints are difficult to form because ceramics have very low thermal expansion rates as compared to the thermal expansion rates of the metal alloys now being used. Thermal expansion rate is a measure of how fast a sample of material expands or grows as it is heated. The coefficient of thermal expansion is generally noted as alpha ($\alpha$) and its units are inches per inch per degree farenheit. Generally, a one inch long steel bar will expand about ten millionths of an inch per one degree farenheit increase in temperature (alpha=$10 \times 10^{-6}$ in/in/°F.). Silicon nitride ceramics generally expand at about one-fifth of the rate for steel (alpha=$1-2 \times 10^{-6}$ in/in/°F.).

If a ceramic/metal attachment joint is heated or cooled from its assembly temperature, the steel half of the joint changes shape and size five times faster than the ceramic half of the joint. The steel half of the joint attempts to drag the ceramic half of the joint with it either through some interlocking feature such as ceramic over steel shaft joint, or a locking caused by frictional forces. Unfortunately ceramic to metal joints exhibit very high coefficients of friction. The growth of ceramic and steel parts due to heating is unstoppable. Any externally applied forces used to try to maintain original shapes during heating of parts which are subject to such growth merely cause the piece being restrained to develop whatever forces are required to overcome the restraint. Hence, if the ceramic half of the ceramic/metal joint tries to restrain a more rapidly expanding metal, huge forces rapidly develop in the ceramic/metal joint which result in rapid and certain failures to the ceramic portion of the joint.

In the past, I have attached ceramic rotors with a mounting system that used curvic gear teeth between the ceramic part and the metal part to hold the parts together. The frictional forces generated between the teeth during heating of the ceramic and metal joined structure caused rapid failure of the ceramic part of the joint. A 100° F. increase in temperature above assembly temperature of the ceramic/metal joint was enough to break the ceramic half of the joint due to the forces applied thereon by the growing metal half of the joint. The teeth of the metal curvic gear had to be plated with pure gold in order to cause a slipping condition between the teeth rather than a lockup between the teeth of the ceramic half and the metal half of the joined structure. Gold plating in such a manner had the ability to provide operation of such a joined structure at a temperature in a range of 1400°–1800° F., but the lubricating ability of the gold plate was only good for 8–10 thermal cycles on the joint. After this number of thermal cycles, the joint would fail. Additionally, the curvic teeth are ground by special machinery and very few people are skilled in the manufacture of such teeth. The cost of grinding the teeth was several hundred dollars per set of teeth, and one rotor required four such sets of teeth.

The method of attaching a metal shaft to a ceramic shaft set forth in this specification is one designed to reduce the severity of the thermal gradients set forth in the joint by placing the joint in an area of the turbine bearing component where the temperature during operation generally would not exceed 400° F. The unique method of attaching a metal shaft to a ceramic shaft and product produced thereby will be discussed in greater detail hereinbelow, but such a method is economical to carry out and very reliable in joining such structures.

DISCLOSURE OF THE INVENTION

This invention relates to a method of attaching a metal shaft to a ceramic shaft and to the product produced thereby. In accordance with the teachings of this specification, a method of attaching a metal shaft to a ceramic shaft having a first diameter is characterized by the following steps.

A shaft portion having a second diameter less than the first diameter of the ceramic shaft is formed on the ceramic shaft. The shaft portion extends from a free end of the ceramic shaft along a portion of the length of the ceramic shaft to a terminal end thereof where the ceramic shaft is of the first diameter.

A circular shaped metal lock nut is placed on the shaft portion of the ceramic shaft in an encircling relationship therewith. The metal lock nut has an internal diameter slightly greater than the second diameter of the shaft portion of the ceramic shaft and also has threads on an outer facing surface thereof. A back end of the metal lock nut is located adjacent the terminal end of the shaft portion of the ceramic shaft.

A circular shaped expansion sleeve which has an internal diameter slightly greater than the second diameter of the shaft portion of the ceramic shaft is placed on the shaft portion of the ceramic shaft. The expansion sleeve extends along the shaft portion of the ceramic shaft from the metal lock nut to the free end of the shaft portion of the ceramic shaft.

The ceramic shaft, the metal lock nut, and expansion sleeve placed thereon are all cooled to contract all of the mentioned members.

An adjustable metal plug is assembled with the cooled members by positioning it adjacent the free end of the shaft portion of the ceramic shaft. A metal shaft formed so as to have both a hollow interior portion and threads formed on a free end of the hollow interior portion thereof is also assembled with the cooled members. The metal shaft is assembled in the following manner. The threads on the outer surface of the lock nut are engaged with the threads formed on the free end of the hollow interior portion of the metal shaft. The expansion sleeve is trapped in a volume defined by the shaft portion of the ceramic shaft, the hollow interior portion of the metal shaft, the lock nut, and the adjustable metal plug. The adjustable metal plug is encircled by the hollow interior portion of the metal shaft and is located between the free end of the shaft portion of the ceramic shaft and a closed end of the hollow interior portion of the metal shaft.

The method is operative to join the metal shaft to the ceramic shaft because of the action of the expansion sleeve which attempts to expand upon heating but is restrained by the surrounding structures and hence generates a high pressure which locks the parts together.

The product produced by the method disclosed above is characterized in the following manner.

The ceramic shaft to be attached to the metal shaft has a shaft portion formed thereon having a second diameter less than the first diameter of the ceramic shaft. The shaft portion extends from a free end of the ceramic shaft to a terminal end thereof where the ceramic shaft is of the first diameter.

A circular shaped metal lock nut having an internal diameter slightly greater than the second diameter of the shaft portion of the ceramic shaft encircles the shaft portion of the ceramic shaft. This lock nut has threads on an outer facing surface thereof. The lock nut also has a back end which is located adjacent the terminal end of the shaft portion of the ceramic shaft.

A circular shaped expansion sleeve having an internal diameter slightly greater than the second diameter of the shaft portion of the ceramic shaft encircles the shaft portion of the ceramic shaft. This expansion sleeve extends along the shaft portion of the ceramic shaft from the metal lock nut to the free end of the shaft portion.

An adjustable metal plug is positioned adjacent the free end of the shaft portion of the ceramic shaft. A metal shaft is also provided which is formed so as to have both a hollow interior portion and threads formed on a free end of the hollow interior portion thereof. This metal shaft is secured to the metal lock nut in a manner such that the following conditions are observed. The interior threads on the free end of the hollow interior portion of the metal shaft are engaged with the threads on the outer surface of the lock nut. The expansion sleeve is trapped in a volume defined by the shaft portion of the ceramic shaft, the hollow interior portion of the metal shaft, the lock nut, and the adjustable metal plug. Also, the adjustable metal plug is encircled by the hollow interior portion of the metal shaft and is located between the free end of the shaft portion of the ceramic shaft and a closed end of the hollow interior portion of the metal shaft.

In the preferred method and product produced thereby, described above, an adjustable metal plug is used which is positioned adjacent the free end of the shaft portion of the ceramic shaft. By adjustable metal plug I mean that the length dimension thereof may be adjusted in accordance with the dimensions of the ceramic shaft and metal shaft. If the dimensions of the shaft are controlled accurately, it may be possible to eliminate the use of the metal plug in its entirety. However, I have found that use of such a metal plug allows one to take up tolerances by sizing that plug to fit the particular dimensions of the shafts involved.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures, and in which:

FIG. 1 shows a metal shaft attached to a ceramic shaft in accordance with the teachings of the method of this invention; and wherein FIG. 2 shows the parts of FIG. 1 in a disassembled condition.

BEST MODE AND INDUSTRIAL APPLICABILITY

The following description is what I consider to be a preferred embodiment of my method of attaching a metal shaft to a ceramic shaft and product produced thereby. The following description also sets forth what I now contemplate to be the best mode of carrying out the method of this invention to produce the product of this invention. This description is not intended to be a limitation upon the broader principles of this method and product produced thereby, and while preferred material are used to illustrate the method in accordance with the requirements of the patent laws, it does not mean that the method is operative only with the stated materials as others may be substituted therefor.

A preferred embodiment of the method of my invention will be set forth below to describe the attachment of a metal shaft 10, formed from a metal such as a high strength steel, to a ceramic shaft 12, formed of a material such as silicon nitride. The ceramic shaft 12 has a principal portion thereof of a diameter $d_1$. As viewed in FIG. 1, the principal portion of the shaft 12 terminates at its left end in a rotor structure 14 formed together with the shaft 12. The individual rotor blades of the rotor structure are not defined in the drawings for the sake of simplicity.

A shaft portion 16 is also formed on the ceramic shaft 12. The shaft portion 16 has a diameter $d_2$ less than the first diameter $d_1$ of the principal portion of the ceramic shaft 12. The shaft portion 16 extends from a free end 18 of the ceramic shaft along a portion of the length of the ceramic shaft to a terminal end 20 where the ceramic shaft 12 is of its first diameter $d_1$.

A circular shaped metal lock nut 22 encircles the shaft portion 16 of the ceramic shaft 12. This lock nut has an internal diameter slightly greater than the second diameter $d_2$ of the shaft portion of the ceramic shaft. The lock nut has threads 24, best seen in FIG. 1, on an outer facing surface thereof. A back end 26 of the lock nut 22 is located adjacent the terminal end 20 of the shaft portion 16 of the ceramic shaft 12.

The next step in the method of my invention is one in which a circular shaped expansion sleeve 28 is placed on the shaft portion 16 of the ceramic shaft 12 in an encircling relationship therewith. At room temperature the expansion sleeve has an internal diameter which is somewhat greater than the second diameter $d_2$ of the shaft portion 16 of the ceramic shaft 12. At room temperature the expansion sleeve 28 extends along the shaft portion 16 from the lock nut 22 generally a little past the free end 18 of the shaft portion 16 of the ceramic shaft 12.

The expansion sleeve 28 is an important element in carrying out the method of my invention and of producing the product produced thereby. The expansion sleeve is normally formed of a resinous material. I prefer to use a polyimide resin such as that type of resin sold by Dupont as Vespel SP-22. The expansion sleeve is designed to have a thermal expansion rate approximately twice as great as steel and 10 times as great as that of the ceramic. Normally the plastic is soft compared to steel and ceramic and complies to the ceramic and, therefore, does not cause high local contract stresses in the ceramic material. Normally the expansion sleeve should be made of a material which has an upper working temperature in the range of 300°–400° F. Also, the bulk modulus of the plastic forming the expansion sleeve should be low enough to allow pressures in the range of 10,000 psi to be generated when the material is trapped in an entrapping volume and the structure is heated to a temperature above its assembly temperature. Any material which meets these qualification may be used to form the expansion sleeve 28.

The next step in the method of my invention is to cool the ceramic shaft 12, the lock nut 22, and expansion sleeve 28 which have been placed over the shaft portion 16 of the ceramic shaft in order to contract all of these members. The members are cooled by placing them in a dry ice/alcohol solution having a temperature 80° to 100° below zero farenheit. Upon cooling, the expansion sleeve 28 contracts lengthwise so that its free end terminates at the free end 18 of the shaft portion 16 of the ceramic shaft 12 and its internal diameter is brought into contact with the diameter $d_2$ of the shaft portion of the ceramic shaft.

While these members remain in a cooled condition, the following members are assembled therewith. An adjustable metal plug 30 is positioned adjacent the free end 18 of the ceramic shaft 12. By adjustable, I mean that the length of the plug can be made to any desirable size depending upon the tolerances of the other members making up the assembly. If all of the tolerances are very accurate, the adjustable metal plug 30 may be dropped from the assembly. However, I find that it is useful to have such a metal plug because it allows one metal shaft design to accommodate ceramic shafts with slightly varying lengths.

In accordance with the teachings of the method of this invention, the metal shaft 10 is formed to have a free end 32 which has both a hollow interior portion 34 and interior facing threads 36 formed therein.

The metal shaft 10 is assembled with the cooled members in a manner such that the threads 24 on the metal lock nut 22 are engaged with the threads 36 formed on the free end 32 of the hollow interior portion 34 of the metal shaft 10. The expansion sleeve 28 is also trapped in a volume defined by the shaft portion 16 of the ceramic shaft 12, the hollow interior portion 34 of the metal shaft 10, the lock nut 22, and the adjustable metal plug 30. Another condition existing is that the adjustable metal plug 30 is encircled by the hollow interior portion 34 of the metal shaft 10 and is located between the free end 18 of the shaft portion 16 of the ceramic shaft 12 and a closed end 38 of the hollow interior portion 34 of the metal shaft 10.

In accordance with a preferred embodiment of this invention, the expansion sleeve 28 is designed to be about 1–2% larger than the room temperature volume in which it is confined between the shaft portion of the ceramic shaft, the hollow interior portion of the metal shaft, the lock nut, and the adjustable metal plug. Thus, as the assembly comes back to ambient temperature, after assembly at low temperature, the plastic expansion sleeve 28 tries to expand and, since it is confined within the confinement space, it generates pressure in the volume it occupies, thus locking the whole assembly together as a unitary piece. As the entire assembly is heated to an operational temperature, the pressure inside the closed volume increases due to the expansion of the expansion sleeve thus increasing the locking forces to retain the metal shaft 10 locked to the ceramic shaft 12.

Thus, in accordance with the method of this invention, there is produced an attachment between a metal shaft and a ceramic shaft having a first diameter. The attachment is characterized in the following manner.

The ceramic shaft has a shaft portion formed thereon having a second diameter less than the first diameter of the ceramic shaft. The shaft portion extends from a free end of the ceramic shaft to a terminal end thereof where the ceramic shaft is of the first diameter.

A circular shaped metal lock nut having an internal diameter slightly greater than the second diameter of the shaft portion of the ceramic shaft is in an encircling relationship with the shaft portion of the ceramic shaft. The metal lock nut has threads on an outer facing surface thereof. The lock nut also has a back end thereof located adjacent the terminal end of the shaft portion of the ceramic shaft.

A circular shaped expansion sleeve has an internal diameter slightly greater than the second diameter of the shaft portion of the ceramic shaft. The expansion sleeve encircles the shaft portion of the ceramic shaft and extends along the shaft portion from the metal lock nut to a free end of the shaft portion. An adjustable metal plug is also positioned adjacent the free end of the shaft portion of the ceramic shaft.

The metal shaft is formed so as to have both a hollow interior portion and threads formed on a free end of the hollow interior portion thereof. The metal shaft is secured to the metal lock nut in a manner such that the following conditions are met. The interior threads on the free end of the hollow interior portion of the metal shaft are engaged with the threads on the outer surface of the lock nut. The expansion sleeve is trapped in a volume defined by the shaft portion of the ceramic shaft, the hollow interior portion of the metal shaft, the lock nut, and the adjustable metal plug. The adjustable metal plug is encircled by the hollow interior portion of the metal shaft and is located between the free end of the shaft portion of the ceramic shaft and a closed end of the hollow interior portion of the metal shaft.

While a particular embodiment of the method and product of this invention has been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. A method of attaching a metal shaft to a ceramic shaft having a first diameter, characterized by the steps of:
   forming on the ceramic shaft a shaft portion having a second diameter less than the first diameter of the ceramic shaft, said shaft portion extending from a free end of the ceramic shaft along a portion of the length of the ceramic shaft to a terminal end thereof where the ceramic shaft is of the first diameter;
   placing on said shaft portion in an encircling relationship therewith a circular shaped metal lock nut which has an internal diameter slightly greater than said second diameter of said shaft portion of the ceramic shaft, said metal lock having threads on an outer facing surface thereof, a back end of said metal lock nut being located adjacent said terminal end of said shaft portion of the ceramic shaft;
   placing on said shaft portion of the ceramic shaft in an encircling relationship therewith a circular shaped expansion sleeve which has an internal diameter slightly greater than said second diameter of said shaft portion of the ceramic shaft, said expansion sleeve extending along said shaft portion from said metal lock nut to said free end of said shaft portion;
   cooling the ceramic shaft, said metal lock nut and said expansion sleeve to contract all of said mentioned members;
   assembling with said cooled members (1) an adjustable metal plug which is positioned adjacent said free end of said shaft portion of the ceramic shaft, and (2) a metal shaft formed so as to have both a hollow interior portion and threads formed on a free end of said hollow interior portion thereof, said assembly being carried out in a manner such that (A) said threads on said outer surface of said lock nut are engaged with said threads formed on said free end of said hollow interior portion of said metal shaft, (B) said expansion sleeve is trapped in a volume defined by said shaft portion of the ceramic shaft, said hollow interior portion of said metal shaft, said lock nut, and said adjustable metal plug, and (C) said adjustable plug is encircled by said hollow interior portion of said metal shaft and is located between said free end of said shaft portion of the ceramic shaft and a closed end of said hollow interior portion of said metal shaft.

2. An attachment between a metal shaft and a ceramic shaft having a first diameter, the attachment being characterized in that:
   the ceramic shaft has a shaft portion formed thereon having a second diameter less than the first diameter of the ceramic shaft, said shaft portion extending from a free end of the ceramic shaft to a terminal end thereof where the ceramic shaft is of the first diameter;
   a circular shaped metal lock nut having an internal diameter slightly greater than said second diameter of said shaft portion of the ceramic shaft, said lock nut encircling said shaft portion of the ceramic shaft and having threads on an outer facing surface thereof, a back end of said metal lock nut being located adjacent said terminal end of said shaft portion of the ceramic shaft;
   a circular shaped expansion sleeve having an internal diameter slightly greater than said second diameter of said shaft portion of the ceramic shaft, said expansion sleeve encircling said shaft portion of the ceramic shaft and extending along said shaft portion from said metal lock nut to said free end of said shaft portion;
   an adjustable metal plug positioned adjacent said free end of said shaft portion of the ceramic shaft; and
   a metal shaft formed so as to have both a hollow interior portion and threads formed on a free end of said hollow interior portion thereof, said metal shaft being secured to said metal lock nut in a manner such that (A) said interior threads on said free end of said hollow interior portion of said metal shaft are engaged with said threads on said outer surface of said lock nut, (B) said expansion sleeve is trapped in a volume defined by said shaft portion of the ceramic shaft, said hollow interior portion of said metal shaft, said lock nut, and said adjustable metal plug, and (C) said adjustable metal plug is encircled by said hollow interior portion of said metal shaft and is located between said free end of said shaft portion of the ceramic shaft and a closed end of said hollow interior portion of said metal shaft.

3. A method of attaching a metal shaft to a ceramic shaft having a first diameter, characterized by the steps of:
   forming on the ceramic shaft a shaft portion having a second diameter less than the first diameter of the ceramic shaft, said shaft portion extending from a free end of the ceramic shaft along a portion of the length of the ceramic shaft to a terminal end thereof where the ceramic shaft is of the first diameter;
   placing on said shaft portion in an encircling relationship therewith a circular shaped metal lock nut which has an internal diameter slightly greater than said second diameter of said shaft portion of the ceramic shaft, said metal lock having threads on an outer facing surface thereof, a back end of said metal lock nut being located adjacent said terminal end of said shaft portion of the ceramic shaft;
   placing on said shaft portion of the ceramic shaft in an encircling relationship therewith a circular shaped expansion sleeve which has an internal diameter slightly greater than said second diameter of said shaft portion of the ceramic shaft, said expansion sleeve extending along said shaft portion from said metal lock nut to said free end of said shaft portion;
   cooling the ceramic shaft, said metal lock nut, and said expansion sleeve to contract all of said mentioned members;
   assembling with said cooled members a metal shaft formed so as to have both a hollow interior poriton and threads formed on a free end of said hollow interior portion thereof, said assembly being carried out in a manner such that (A) said threads on said outer surface of said lock nut are engaged with said threads formed on said formed on said free end of said hollow interior portion of said metal shaft, and (B) said expansion sleeve is trapped in a volume defined by said shaft portion of the ceramic shaft, said hollow interior portion of said metal shaft, said lock nut, and a closed end of said hollow interior portion of said metal shaft.

4. An attachment between a metal shaft and a ceramic shaft having a first diameter, the attachment being characterized in that:
   the ceramic shaft has a shaft portion formed thereon having a seocnd diameter less than the first diameter of the ceramic shaft, said shaft portion extending from a free end of the ceramic shaft to a terminal end thereof where the ceramic shaft is of the first diameter;

a circular shaped metal lock nut having an internal diameter slightly greater than said second diameter of said shaft portion of the ceramic shaft, said lock nut encircling said shaft portion of the ceramic shaft and having threads on an outer facing surface thereof, a back end of said metal lock nut being located adjacent said terminal end of said shaft portion of the ceramic shaft;

a circular shaped expansion sleeve having an internal diameter slightly greater than said second diameter of said shaft portion of the ceramic shaft, said expansion sleeve encircling said shaft portion of the ceramic shaft and extending along said shaft portion from said metal lock nut to said free end of said shaft portion; and a metal shaft formed so as to have both a hollow interior portion and threads formed on a free end of said hollow interior portion thereof, said metal shaft being secured to said metal lock nut in a manner such that (A) said interior threads on said free end of said hollow interior portion of said metal shaft are engaged with said threads on said outer surface of said lock nut, and (B) said expansion sleeve is trapped in a volume defined by said shaft portion of the ceramic shaft, said hollow interior portion of said metal shaft, said lock nut, and a closed end of said hollow interior portion of said metal shaft.

* * * * *